United States Patent [19]

Tae

[11] Patent Number: 4,734,919
[45] Date of Patent: Mar. 29, 1988

[54] CIRCUIT FOR SERIAL DATA COMMUNICATION AND POWER TRANSMISSION

[75] Inventor: Choe J. Tae, Seoul, Rep. of Korea

[73] Assignee: Gold Star Tele-Electric Co., Ltd. Incorporated, Chung-gu Seoul, Rep. of Korea

[21] Appl. No.: 348,130

[22] Filed: Feb. 12, 1982

[30] Foreign Application Priority Data

Feb. 20, 1981 [KR] Rep. of Korea ............. 549/1981[U]

[51] Int. Cl.$^4$ ..................... H04B 3/50; H04L 25/02
[52] U.S. Cl. ........................... 375/7; 178/49; 178/63 R; 375/36
[58] Field of Search ............ 178/63 R, 45, 49; 179/170 J; 307/2; 340/310 R, 310 A; 375/36, 7; 370/24, 31, 32; 379/93, 97, 98, 109, 186

[56] References Cited

U.S. PATENT DOCUMENTS

| | | | |
|---|---|---|---|
| 1,687,432 | 10/1928 | Drake | 178/49 |
| 3,413,413 | 11/1968 | Peisl | 178/45 |
| 3,671,671 | 6/1972 | Watanabe | 178/63 R |
| 3,835,334 | 9/1974 | Notteau | 179/170 J |
| 4,341,927 | 7/1982 | Shinoi et al. | 375/36 |
| 4,402,073 | 8/1983 | Hammond | 375/22 |

OTHER PUBLICATIONS

The Radio Amateur's Handbook, 1964, pp. 226-227, TK6550 R162.
The Radio Amateur's Handbook, 41st edition, 1964, pp. 224+225.

*Primary Examiner*—Benedict V. Safourek
*Attorney, Agent, or Firm*—Blum Kaplan

[57] ABSTRACT

A circuit for serial data communication and power transmission between a main controller and a sub-station along two balanced transmission lines. The circuit includes a power supply for providing a DC voltage to the sub-station along the transmission lines. A main controller sending circuit generates two data signals of substantially equal magnitude and opposite polarity and supplies the data signals to the transmission lines. A sub-station receiving circuit detects the data signals on the transmission lines and converts the data signals into a serial format output data signal.

12 Claims, 2 Drawing Figures

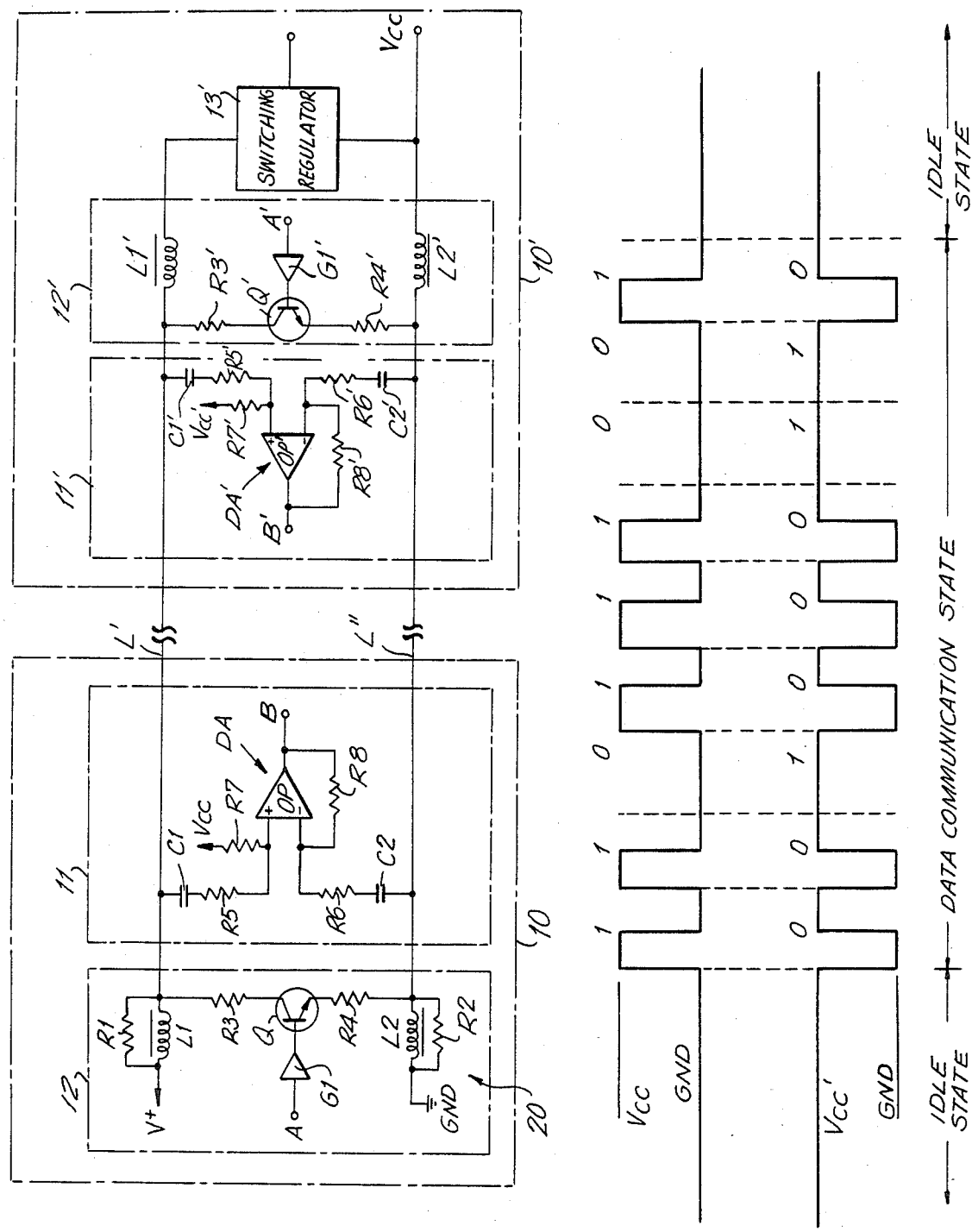

CIRCUIT FOR SERIAL DATA COMMUNICATION AND POWER TRANSMISSION

BACKGROUND OF THE INVENTION

The present invention is generally directed to a serial data communication system and, in particular, to a circuit for power transmission and serial data communication which transmits both power and data through two balanced transmission lines connecting a main controller and a sub-station separated by a distance. Most of the previous serial data communication systems were configured with separate power transmission and data transmission paths. This required a significant number of connection lines to link a main controller to a sub-station. Also, to improve the reliability of data communication the data transmission circuits were configured as a balanced network, which required additional complexity.

Accordingly, a power transmission and data communication circuit which transmits power from the main controller to a sub-station through two transmission lines and also, at the same time, transmits data along the same two transmission lines, all in a balanced network, is desired. It is also desired to extend the range between the main controller and one or more remote sub-stations without significant power loss or susceptability to outside interference.

SUMMARY OF THE INVENTION

Generally speaking, in accordance with the invention a circuit for serial data communication and power transmission between a main controller and a sub-station along two balanced transmission lines is provided. The circuit consists of power supply circuitry for providing DC voltage to the sub-station along the transmission lines. A main controller sending circuit generates two data signals of substantially equal magnitude and opposite polarity in response to a serial format input signal and supplies the data signals to the transmission lines. Sub-station receiving circuitry detects data signals on the transmission lines and converts the data signal into a serial format output data signal.

Accordingly, it is an object of the present invention to provide an improved circuit for serial data communication and power transmission.

Another object of the present invention is to provide an improved circuit for serial data communication and power transmission which transmits both DC power and serial data information on a single pair of lines.

Yet another object of the present invention is to provide a circuit for serial data communication and power transmission which allows for greater distances between a main controller and a sub-station.

Still another object of the present invention is to provide a circuit for serial data communication and power transmission which uses balanced lines and avoids interference near the transmission line.

A further object of the invention is to provide a circuit for serial data communication and power transmission which is particularly suited to return-to-zero format half-duplex data communication systems.

Yet another object of the invention is to provide a reliable circuit for serial data communication and power transmission.

Still other objects and advantages of the invention will in part be obvious and will in part be apparent from the specification.

The invention accordingly comprises the features of construction, combinations of elements, and arrangement of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 1 is a schematic circuit diagram of an electrical circuit utilized and constructed in accordance with a preferred embodiment of the present invention; and FIG. 2 is a signal wave diagram illustrating signal wave forms produced in the circuit shown in FIG. 1.

DETAILED DESCRIPTION OF THE PREFERRED EMBODIMENTS

Reference is made to FIG. 1 wherein a main controller, generally indicated as 10 and a first sub-station, generally indicated as 10′ are linked to each other by transmission lines L′, L″.

Main controller 10 and sub-station 10′ have the same functional elements except for the addition of a switching regulator 13′ in sub-station 10′ which supplies operating power to the components of sub-station 10′. Both main controller 10 and sub-station 10′ have data sending circuitry 12, 12′ and data receiving circuitry 11, 11′. In addition, each of these functional blocks is symmetrically constructed into upper and lower portions, thereby causing each of the circuit blocks to operate as a balanced network. The advantages of the balanced network function includes a reduction in the effect, common mode external noise signals generated in the vicinity of the transmission paths, on the data transmission.

Lines L′, L″ are used for both power transmission and data transmission. The power is in the form of a DC voltage signal upon which is superimposed an AC data signal. A supplied power V+ in main controller 10 is fed to sub-station 10′ via choke coils L1, L2, L1′, L2′ and transmission lines L′, L″. Choke coils L1, L2, L1′, L2′ provide no appreciable DC resistance. However, the line resistance of transmission lines L′, L″ increases as the distance between main controller 10 and sub-station 10′ increases. This line resistance is the major limitation to the unlimited extension of the distance between main controller 10 and sub-station 10′.

The DC power is continuously fed from main controller 10 to sub-station 10′. The DC voltage loop includes choke L1, line L′, choke L1′, switching regulator 13′, choke L2′, line L″ and choke L2 before reaching ground. Because the DC resistance of chokes L1, L1′, L2, L2′ is negligible, where there is a DC current loop as here, the only power loss is in lines L′, L″. Switching regulator 13′ is configured to always output a voltage $V_{cc}$ independent of the input current, which does not need to be particularly high.

With a lower current flowing through lines L′, L″ the power loss in the lines is decreased because it varies directly with the current flow through the lines L′, L″. Simply, a higher percentage of the generated power is usable if the current through lines L′, L″ is reduced at a given power output. The absence of resistors in the power transmission network other than the resistance associated with lines L', L" serves to minimize power loss and thereby extend the possible distance between main controller 10 and sub-station 10'.

Both main controller 10 and sub-station 10' contain a data sending circuit 12, 12' and a data receiving circuit 11, 11' which operate in similar ways. For ease of explanation the data communication between data sending circuit 12 in main controller 10 and data receiving circuit 11' in sub-station 10' will be described. However, the circuitry as configured can also communicate between data sending circuit 12' of sub-station 10' and data receiving circuit 11 of main controller 10.

Data sending circuit 12 of main controller 10 consists of a serial data input terminal A, buffer gate G1, and a voltage modulator 20 which consists of resistors R1, R2, R3, R4, choke coils L1, L2 and transistor Q. Data sending circuit 12' of sub-station 10' is similarly constructed from serial input terminal A', buffer gate G1' and resistors R1', R2', R3' and R4'.

Data receiving circuit 11' consists of a differential amplifier composed of operational amplifier OP', resistors R5', R6', R7', R8' and data coupling capacitors C1', C2'. Data receiving circuit 11' has an output B' which is the data receiving terminal of sub-station 10'. These simple circuits allow transmission from main controller 10 to sub-station 10'. Transmission from sub-station 10' to main controller 10 is also possible when transmitter 12' and receiver 11 are included in the circuit.

Reference is next made to both FIGS. 1 and 3, in particular FIG. 2 where representative signals are shown. When the circuitry is in the idle state, terminal A is in its logical low level state (GND level). In this state, buffer gate G1 provides a low input to the gate of transistor Q and maintains transistor Q in its off state. The effect of this is that the voltage modulator is inoperative. There is, therefore, no change in voltage on lines L', L".

However, when a logic high level ($V_{cc}=1$) data signal appears on the data input terminal A, buffer gate G1 (which can be a typical CMOS buffer) turns on transistor Q. The inductance of choke coils L1, L2 should be chosen so that it is high enough that the impedance of the choke based on the data pulse frequency is much greater than that of shunt resistors R1, R2. Where this is the case chokes L1, L2 act like open circuits. When there is a high signal present at terminal A and as a result a high signal is present at the gate of transistor Q, transistor Q allows current to flow freely and a current flows through R1, R3, transistor Q, R4 and R2 finally reaching ground. The effect of this is to cause the voltage difference between transmission lines L', L" to change slightly. The magnitude of this voltage change is related to the ratio of the shunt resistors R1, R2, R3, R4. to maintain the balanced network, the resistance of resistors R1, R2 is one value and the resistance of resistors R3, R4 is a second value. The voltage change on lines L', L" is then directly related to the resistance of resistors R1 and R3. The changes in voltage are of the same magnitude on both lines L', L". However, the voltage on line L' decreases from its normal voltage V+ whereas the voltage on line L" increases from its normal, substantially grounded level. The change in voltage can be adjusted to a desired level by adjusting the relative values of resistance in shunt resistors R1, R2, R3, R4.

This invention is particularly well suited to serial data communication using the return-to-zero data format, where each data pulse always returns to the zero state, as shown in FIG. 2. In this zero state transistor Q is in the off state and the modulator 20 composed of choke coil L1, shunt resistors R1, R3, transistor Q, shunt resistors R4, R2 and choke coil L2 is in the idle state. The zero state increases the data frequency and thereby increases the choke impedance as compared to non-return-to-zero format data. Because return-to-zero format data has this higher frequency, chokes L1, L2 can have lower values than would be possible in a non-return-to-zero format. The reduction in the inductance, required to make choke coils L1, L2 act as an open circuit to the changing current as a result of transistor Q switching on, allows the chokes to be made smaller.

Data receiver 11' is configured to detect the presence of a voltage difference on lines L', L". Coupling capacitors C1', C2' prevent the DC component on lines L', L" from reaching differential amplifier DA' which detects the change in voltage on lines L', L". Differential amplifier DA' only amplifies the difference in the signals present at the positive and negative inputs of operational amplifier OP'. Any common mode signal received at both the plus and the minus inputs of operational amplifier OP' is regarded as noise and not amplified. The amplification factor depends upon the ratio of input resistor R6' to feedback resistor R8' or input resistor R5' to biasing resistor R7' (if the resistance of resistor R5' equals the resistance of resistor R6' and the resistance of resistor R7' equals the resistance of resistor R8').

Due to the characteristics of a differential amplifier, the output signal at terminal B' is in an inverted form from that of the original input data, inputted at terminal A (FIG. 2). FIG. 2 shows the effect of an input data train at terminal A on terminal B'. A data train having the value of binary number 110111001, where 1 corresponds to the logical high level ad 0 corresponds to the logical low level is applied to terminal A. As can be seen, the output at terminal B' will be the inverted version of this, namely, 001000110.

In the case of data transmission from sub-station 10' to main controller 10, the operation of data sending circuit 12' in sub-station 10' and data receiving circuit 11' in main controller 10 operates in a similar manner as described above with reference to data sending circuit 12 and data receiving circuit 11'. In this case chokes L1, L2' will act as high impedance elements when a signal is generated at a sufficiently high data rate.

The data communication circuit constructed in accordance with the invention operates well with all return-to-zero format half-duplex data communication systems. However, it can also be used with non-return-to-zero format data communication systems provided that the speed of communication is relatively high. That is, it will operate efficiently if it is a high baud rate serial data communication system. Particularly, the major advantages of this circuit are the reliability of the data communication, the reduction of the number of transmission lines and the expansion of the transmission distance. The balanced network data communication circuitry reduces the effect of external noise signals generated in the vicinity of the transmission path. The configuration of the data transmitters and receivers allows the data transmission lines to be shared with the power transmission path. The step down switching regulator expands the transmission distance at a given power.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention which, as a matter of language, might be said to fall therebetween.

What is claimed is:

1. A circuit for serial data communication and power transmission between a main controller and sub-station along two balanced transmission lines, comprising:
    power supply means for providing a DC voltage to the sub-station along the transmission lines, said power supply means including DC voltage supply means and choke coils coupled between the DC voltage supply means and the transmission lines;
    main controller sending means for generating two first data signals of substantially equal magnitude and opposite polarity in response to a first serial format input signal, and supplying the first data signals along the transmission lines;
    sub-station receiving means for detecting first data signals on the transmission lines and converting the first data signals into a first serial format output data signal; and
    regulating means, coupled to the transmission lines for supplying a DC bias voltage to the sub-station receiving means from the DC voltage provided by the power supply means, said regulating means including choke coils coupled to the transmission lines for substantially eliminating non-DC components from the DC bias voltages.

2. The circuit of claim 1, further including sub-station sending means for generating two second data signals in response to a second serial format input signal and supplying the second data signals to the transmission lines; and main controller receiving means for detecting the second data signals on the transmission lines and converting the second data signals into a second serial format output data signal.

3. The circuit of claim 2, wherein the main controller sending means comprises voltage dividing means and switch means.

4. The circuit of claim 3, wherein the switch means is a transistor and the voltage dividing means are four resistors.

5. The circuit of claim 2, wherein the sub-station receiving means includes balanced coupling means and differential means.

6. The circuit of claim 5, wherein the coupling means are two capacitors of equal capacitance and the differential means is a differential amplifier.

7. The circuit of claim 2, wherein the main controller sending means and receiving means and the sub-station sending means and receiving means are balanced circuits.

8. The circuit of claim 1, wherein the main controller sending means comprises voltage dividing means and switch means.

9. The circuit of claim 8, wherein the switch means is a transistor and the voltage dividing means are four resistors.

10. The circuit of claim 1, wherein the sub-station receiving means includes balanced coupling means and differential means.

11. The circuit of claim 10, wherein the coupling means are two capacitors of equal capacitance and the differential means is a differential amplifier.

12. The circuit of claim 1, wherein the main controller sending means and the sub-station receiving means are balanced circuits.

* * * * *